United States Patent [19]
Pinkesfeld

[11] 3,965,775
[45] June 29, 1976

[54] INDEXING DEVICE
[76] Inventor: Mordehay Pinkesfeld, 86 Atzmauth St., Ashkelon, Israel
[22] Filed: Dec. 27, 1974
[21] Appl. No.: 536,882

[52] U.S. Cl. .............................. 74/827; 74/813 R; 74/816
[51] Int. Cl.² .................. B23B 29/24; B23Q 17/02
[58] Field of Search ............... 74/813 R, 816, 827

[56] References Cited
UNITED STATES PATENTS
| | | | |
|---|---|---|---|
| 3,146,640 | 9/1964 | Moncrieff | 74/827 X |
| 3,380,322 | 4/1968 | Brault | 74/813 |

*Primary Examiner*—John J. Camby
*Attorney, Agent, or Firm*—Weingarten, Maxham & Schurgin

[57] ABSTRACT

An indexing mechanism for converting reciprocating motion into intermittent rotary or linear motion. Driving elements engage driven elements during each motion of the reciprocating member in either direction to effect intermittent motion of the workpiece in the desired location. The driving elements also include locking means to limit the motion imparted by the reciprocating member and lock the driven elements in place until the reciprocating member moves in the opposite direction. Several different embodiments are disclosed employing the same inventive principles.

4 Claims, 21 Drawing Figures

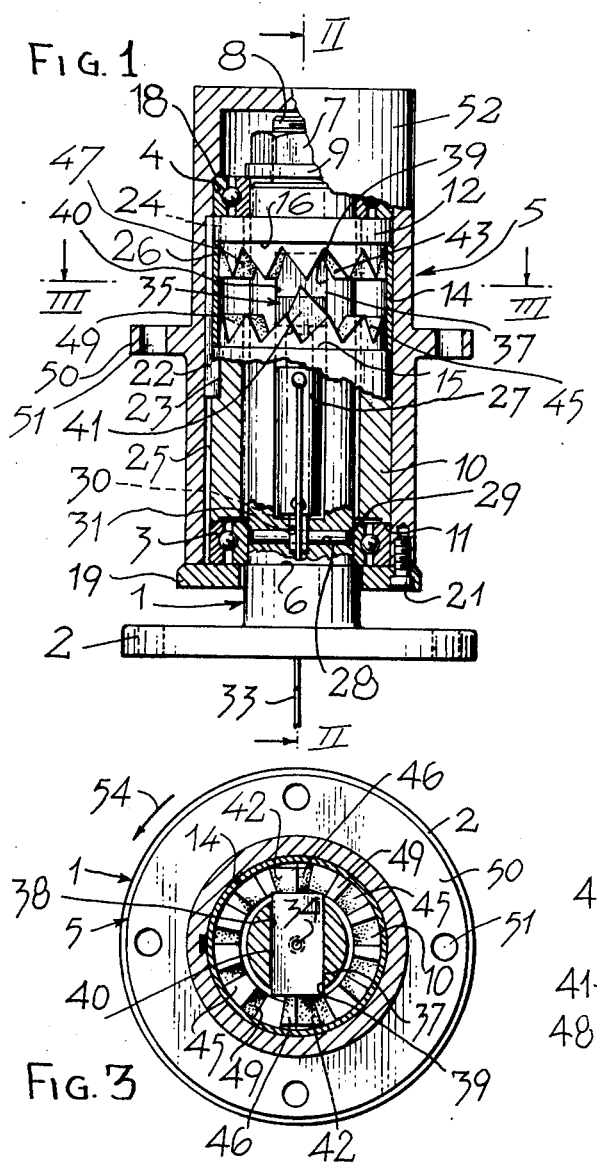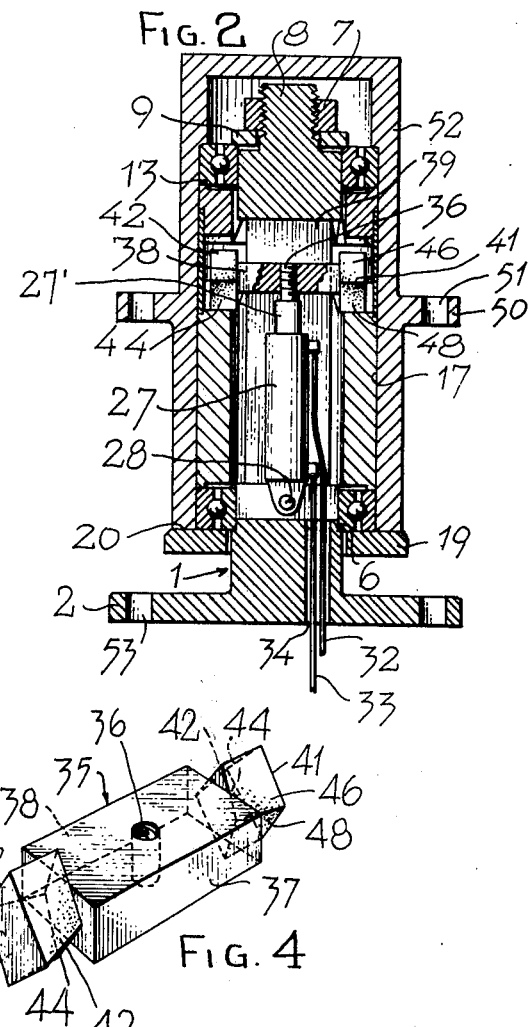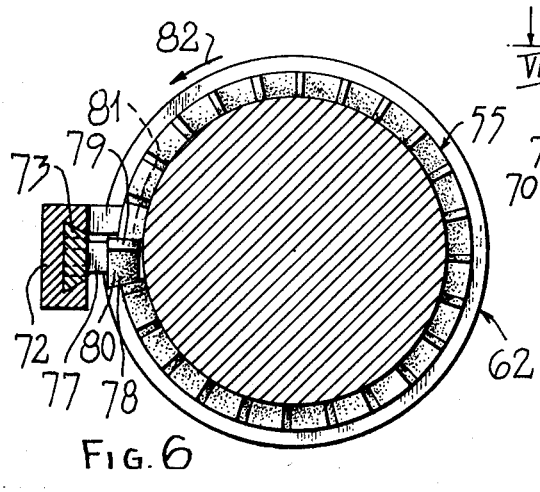

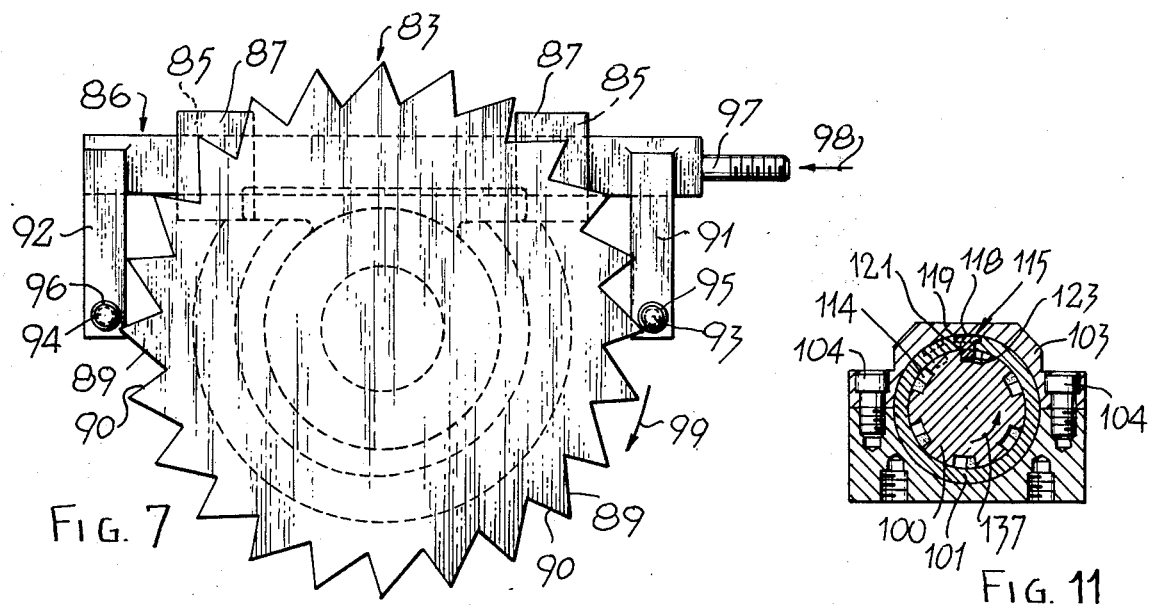
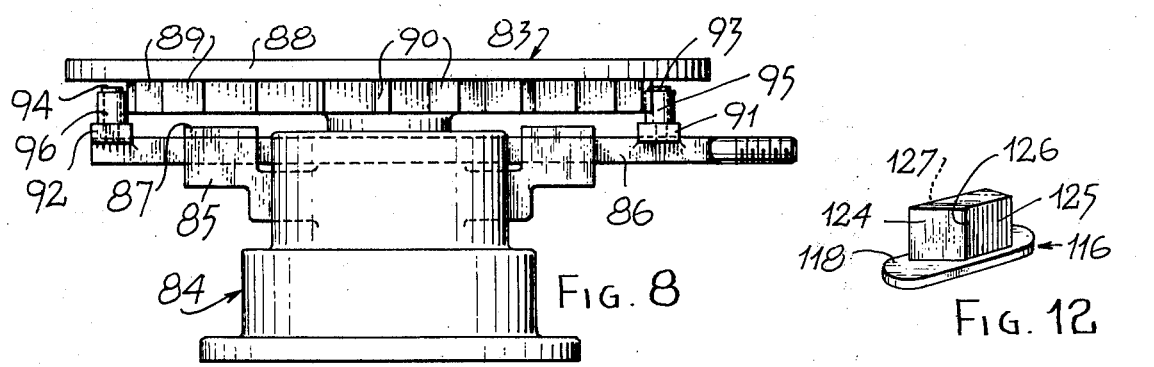
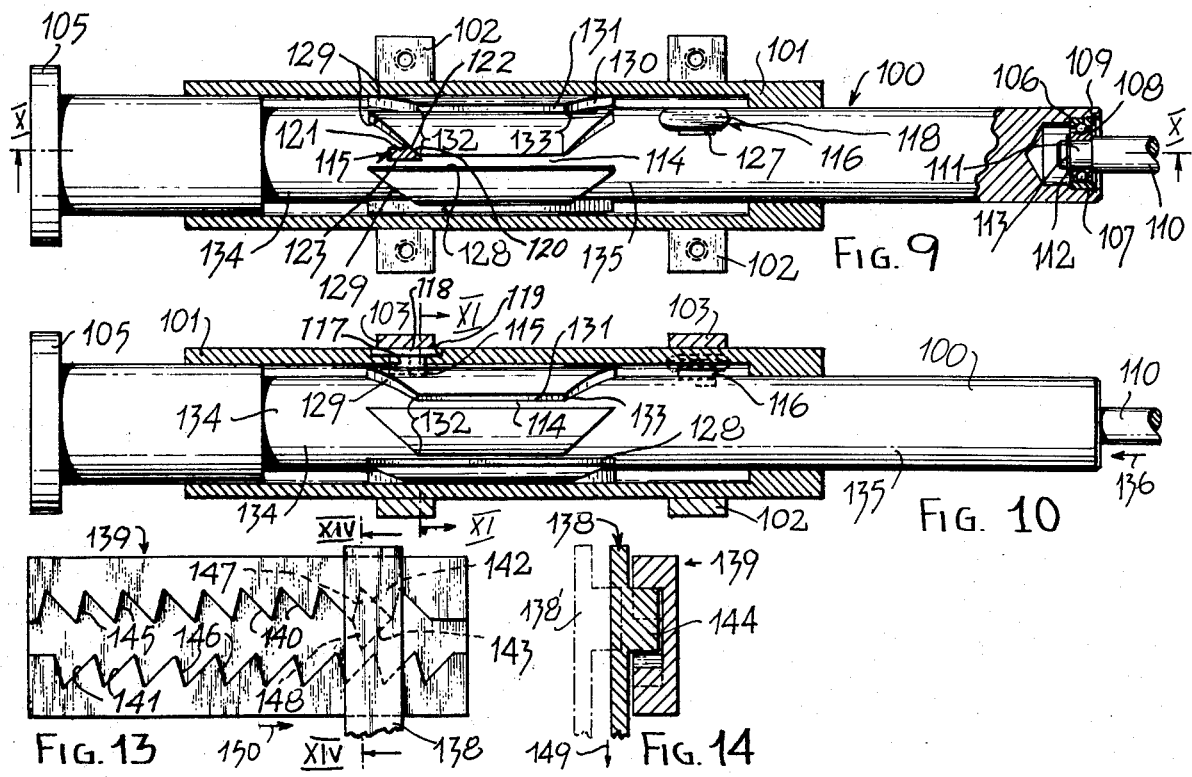

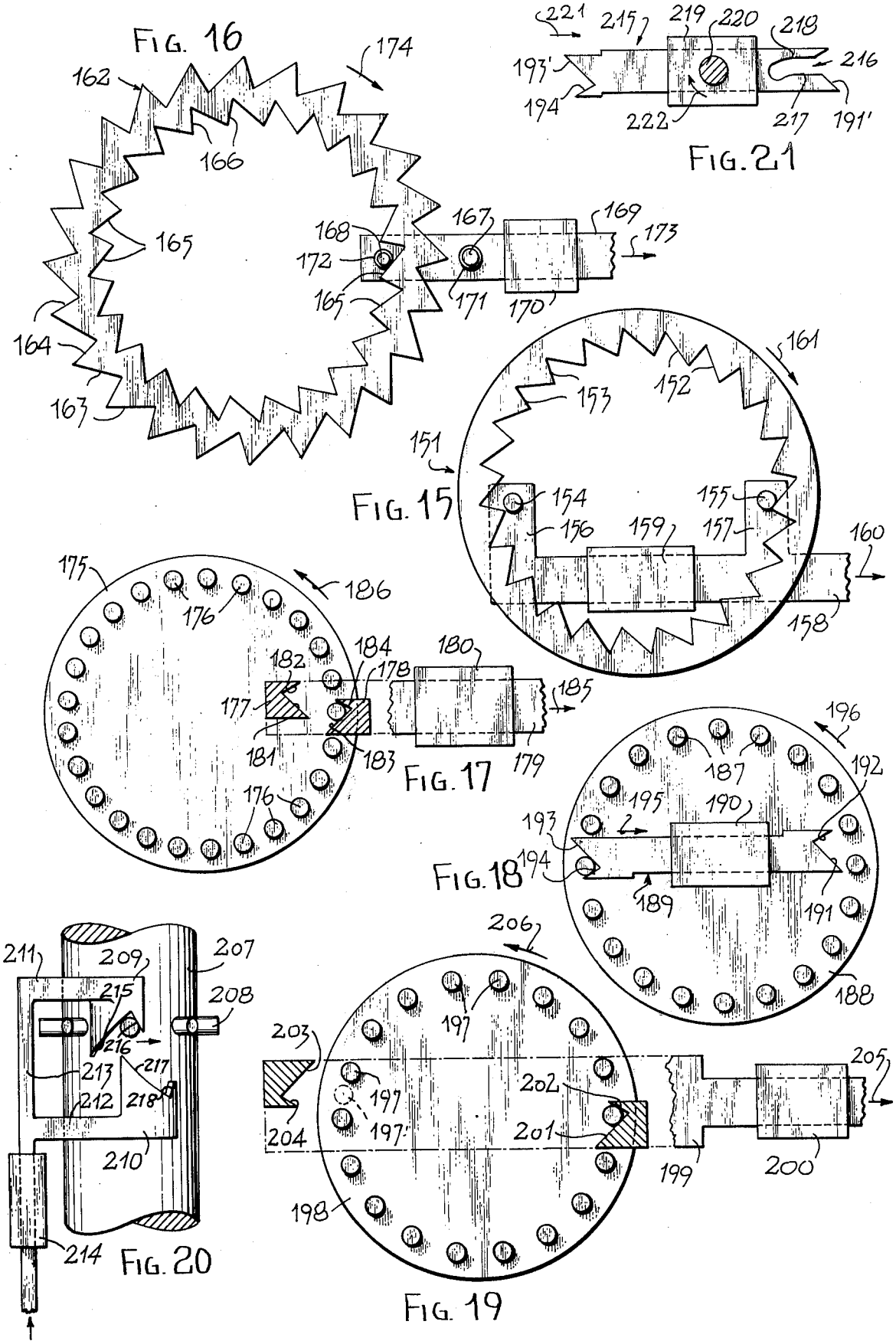

3,965,775

INDEXING DEVICE

This invention relates, in general, to mechanisms for converting reciprocating motion into rotary motion and, more particularly, to an indexing device in which the two steps of advancing and locking are performed in one movement, with the option of incorporating linear displacement as a third step accomplished by the same movement.

Indexing, as in machine turrets or index tables, has heretofore been accomplished by two devices, which, although they may be driven by the same operating means, are separate and distinct from one another — one device causing the turret or table to rotate, and the other locking it in the position to which it has been rotated. To effect linear translation of the turret or table, it has been necessary to add a third device. The invention described herein performs both rotation and locking with each stroke of one device, and, where required, also effects linear translation of the turret or table.

Furthermore, this invention is suitable for driving intermittently rotating devices such as: rolls for feeding strip stock or wire to punch presses and forming machines; rolls for feeding web or sheet material through printing, stamping, or cutting machines; head rolls of conveyors which must move intermittently; and the wheels of agricultural machinery for drilling seeds, setting out plants, and the like. Through suitable resilient connecting means, it can also impart more or less continuous rotary motion to a driven object. It can also effect intermittent rectilinear or curvilinear movement through a finite number of stations.

An object of this invention, therefore, is to provide an indexing device wherein rotation and locking are performed in one movement.

Another object is to provide an indexing device wherein rotation, locking, and linear translation are performed in one movement.

A further object is to fulfill the requirements of the foregoing objects by a device having a minimum number of moving parts.

FIG. 1 is an elevation, partially broken away, showing an indexing device suitable for rotating and locking an index table, turret, or the like, and actuated internally.

FIG. 2 is a vertical cross-sectional view taken on line II—II of FIG. 1.

FIG. 3 is a horizontal cross-sectional view taken on line III—III of FIG. 1.

FIG. 4 is an enlarged perspective view showing the driving head of the mechanism disclosed in FIG. 1.

FIG. 5 is an elevation, partially broken away, showing an indexing device similar to that of FIG. 1, but actuated externally by a driving head reciprocating along a path parallel to the axis of rotation of the device.

FIG. 6 is a horizontal cross-sectional view taken on line VI—VI of FIG. 5.

FIG. 7 is a plan view of an indexing device similar to that of FIG. 5, but actuated by a driving head reciprocating in a plane normal to the axis of rotation of the device, the table having been removed for clarity.

FIG. 8 is a front elevation of the device shown in FIG. 7.

FIG. 9 is a fragmentary plan view of an indexing device suitable for rotating and locking a turret, or the like, and moving it in an axial direction.

FIG. 10 is a vertical cross-sectional view taken on line X—X of FIG. 9.

FIG. 11 is a vertical cross-sectional view taken on line XI—XI of FIG. 10.

FIG. 12 is an enlarged perspective view of a driving lug of FIG. 9.

FIG. 13 is a face view of the essential parts of a rectilinear indexing device, being the special form of the device shown in FIG. 5 for the case in which the radius of rotation equals infinity.

FIG. 14 is a cross-sectional view taken on line XIV—XIV of FIG. 13, including an indication of the removed position of the driving head to permit resetting the device.

FIG. 15 is a plan view of the essential parts of a modified form of the indexing device shown in FIG. 7 in which the teeth of the rotating member are internal.

FIG. 16 is a plan view of the essential parts of a modified form of the indexing device shown in FIG. 7 which includes both internal and external teeth, the driving head being entirely on one side of the center of rotation.

FIG. 17 is a plan view of the essential parts of a modified form of the indexing device shown in FIG. 16 in which the teeth of the rotating member have been replaced by pins and the form of inverted teeth has been given to the driving lugs.

FIG. 18 is a plan view of the essential parts of a modified form of the indexing device shown in FIG. 15 in which the teeth of the rotating member have been replaced by pins and the form of inverted teeth has been given to the two ends of the driving head.

FIG. 19 is a plan view of the essential parts of a modified form of the indexing device shown in FIG. 7 in which the teeth have been replaced by pins and the form of inverted teeth has been given to the driving lugs.

FIG. 20 is an elevation showing the essential parts of an indexing device similar to that shown in FIG. 5 but having pins instead of teeth.

FIG. 21 is a plan view of a modified form of the driving head of FIG. 18, together with its guide, so arranged that reciprocal movement of the driving head in its guide, the disc with its pins being stationary, will result in rotation, locking, and linear movement of the driving head.

In the embodiment of FIGS. 1–4, spindle 1, integral with base 2, is fitted with ball bearings 3 and 4, on which hub 5 is mounted. The inner race of lower ball bearing 3 is seated against shoulder 6 of spindle 1, and nut 7 on threaded extension 8 of spindle 1 applies pressure on the inner race of upper bearing 4 through washer 9. Lower driven bushing 10 bears at its lower face 11 against the upper face of the outer race of lower ball bearing 3, while upper driven bushing 12 bears at its upper face 13 against the lower face of upper ball bearing 4, the two driven bushings being held apart by spacing tube 14, which bears against shoulder 15 of lower driven bushing 10 and shoulder 16 of upper driven bushing 12. The assembly of bearings, driven bushings, and spacing tube, mounted on spindle 1 and secured thereto by nut 7 and washer 9, is slipped into bore 17 of hub 5 until the upper face of the outer race of upper bearing 4 contacts shoulder 18 of hub 5, the assembly being held in place by retaining plate 19, which bears against the lower face of the outer race of lower bearing 3 and is secured to the lower end 20 of hub 5 by screws 21. Key 22, which engages slot 23 of lower driven bushing 10, slot 24 of upper driven bushing 12, and slot 25 of hub 5 and is cut away at 26 to clear spacing tube 14 to ensure that the driven bushings and hub rotate as a unit about the spindle.

Spindle 1 is slotted to receive in its interior fluid actuated cylinder 27, which is attached to the spindle by means of pin 28, which engages hole 29 of spindle 1 and hole 30 of extension 31 of cylinder 27. Tubes 32 and 33, passing through hole 34 of spindle 1 connect cylinder 27 to a source of pressurized fluid and to exhaust through a conventional four-way valve. Piston rod 27', at the upper end of cylinder 27, is attached to driving head 35 by means of threaded hole 36, which engages the thread of the piston rod. Lateral surfaces 37 and 38 of driving head 35 are in sliding contact with inner surfaces 39 and 40 respectively of the slot of spindle 1 and supported thereby against reactive forces that cause rotation of the hub. Integral with driving head 35 at its two ends, and extending outwardly from spindle 1 are two driving lugs 41. Upper driving surfaces 42 of driving lugs 41 are adapted to slide over driven surfaces 43 of teeth formed in the lower end of upper driven bushing 12 and to engage them in full contact when in locking position. Similar but opposite lower driving surfaces 44 of driving lugs 41 are adapted to slide over driven surfaces 45 of teeth formed in the upper end of lower driven bushing 10 and to engage them in full contact when in locking position. Upper locking surfaces 46 of lugs 41 are adapted to make full contact engagement with locking surfaces 47 of the teeth of upper driven bushing 12 when in locking position, and lower locking surfaces 48 of lugs 41 are adapted to make full contact engagement with locking surfaces 49 of the teeth of lower driven bushing 10 when in locking position.

For attachment of an index table or other driven device, hub 5 is provided with flange 50 having holes 51, and upper cylindrical surface 52 of the hub is smoothly finished. Base 2 is provided with holes 53 whereby the indexing device can be secured to any suitable support.

The angle between upper and lower locking surfaces 46 and 48 of driving lug 41 is greater than the angle between upper and lower driving surfaces 42 and 44, up to 180°, in which case the two locking surfaces lie in the same plane. The alignment between the teeth of the lower and upper driven bushings is offset angularly so that when a driving lug moves axially from locking contact with either driven bushing toward the other, its driving surface will contact the driven surface of a tooth of the opposite driven bushing.

In the drawings, the indexing device is shown in its lower locking position. Driving surfaces 44 and locking surfaces 48 of the driving lugs are in contact with driven surfaces 45 and locking surfaces 49 respectively, of lower driven bushing 10, preventing rotation of hub 5 by an external force. When through action of the four-way valve, pressurized fluid enters cylinder 27 through tube 33, the piston will be moved upward in the cylinder, causing piston rod 27' to rise, carrying with it driving head 35 until upper driving surfaces 42 of driving lugs 41 contact driven surfaces 43 of teeth of upper driven bushing 12. Continued upward pressure on the piston will produce a vertical force which due to the slope of the driving and driven surfaces, will have a horizontal component. The restraining action of surfaces 39 and 40 against lateral surfaces 37 and 38 of the driving head prevents rotation of the driving head and lateral displacement of the driving lugs. However, the upper driven bushing, though restrained against axial movement, is free to rotate about its axis. Upward pressure on the piston, therefore, causes the driven bushing, together with the hub, to rotate in the direction of arrow 54 of FIG. 3 until the movement is arrested by contact of locking surfaces 46 of the driving lugs with locking surfaces 47 of upper driven bushing 12. Since the driving and driven surfaces are also in contact with each other, the upper driven bushing and hub are prevented from rotating in either direction until reversal of the four-way valve causes pressurized fluid to enter the cylinder through tube 32 and to move the piston downward. For rotation of lower driven bushing 10 along with hub 5, there is positioned a tooth under each driving lug so that downward movement of the driving head brings lower driving surfaces 44 of the driving lugs into contact with driven surfaces 45 of lower driven bushing 10, continued downward movement causing the lower driven bushing and hub to rotate in the direction of arrow 54 until lower locking surfaces 48 of the lugs contact locking surfaces 49 of the lower driven bushing and rotation of the hub in either direction is prevented. The device has now returned to the condition shown in FIG. 1, except that the hub, together with its upper and lower driven bushings and key has rotated in the direction of arrow 54, FIG. 3, through an angular distance of one tooth of a driven bushing. Further stroking of the cylinder will result in repetition of the actions described above.

The indexing device shown in FIGS. 5 and 6, though different in form, is similar in principle to the foregoing. Integral with rotor 55 are index table 56 at the top and downwardly extending central spindle 57. Around the periphery of the mid section of rotor 55 are upper teeth formed by upper driven surfaces 58 and upper locking surfaces 59 and lower teeth formed by lower driven surfaces 60 and lower locking surfaces 61. Spindle 57 is rotatably mounted in base 62 by means of ball bearings 63 and 64, spaced apart by spacing tube 65 and secured to spindle 57 by pressure of nut 66 acting through washer 67, the bearing assembly being held in place in base 62 by retaining plate 68 and screws 69. Mounted on vertical flat surface 70 of base 62 and attached thereto by screws 71 is guide 72, which is adapted to receive in sliding contact dovetail slide 73 of driving head 74. Downward extension 75 of driving head 74 has a hole 76 for attachment to external actuating means which cause the driving head to move upward and downward in guide 72, the actuating means being such as to cause the driving head to move in one direction or the other until movement is prevented by means external to the actuating means. Extending laterally from driving head 74 in a direction radically inward toward rotor 55 is driving lug 77 which has an upper driving surface 78 adapted to slide over upper driven surface 58 of rotor 55 and to engage them in full contact when in upper locking position, an upper locking surface 79 adapted to make full contact engagement with upper locking surface 59 when in upper locking position, a lower driving surface 80 adapted to slide over lower driven surfaces 60 and to engage them in full contact when in lower locking position, and a lower locking surface 81 adapted to make full contact engagement with lower locking surfaces 61 of rotor teeth when in lower locking position.

The indexing device of FIGS. 5 and 6 is shown in its lower locking position. Lateral movement of driving lug 77 being prevented by the restraining action of guide 72 on dovetail slide 73, upward movement of driving head 74 will bring upper driving surface 78 of driving lug 77 into contact with an upper driven surface 58 of rotor 55, causing the rotor to rotate in the direction of arrow 82 of FIG. 6 until upper locking surface 79 of the driving lug contacts an upper locking surface 59 of the rotor. The indexing device is now in its upper locking position; and rotation of the rotor has positioned a lower driven surface 60 under lower driving surface 80 of the driving lug, so that downward movement of the driving head will effect rotation of the rotor until lower locking surface 81 of the driving lug contacts a lower locking surface 61 of the rotor, the device having returned to its locking position, advanced one one tooth.

In the indexing device of FIGS. 7 and 8, movement of the driving head is in a plane normal to the axis of rotation of the device. Rotor 83 is rotably mounted in base 84 in a manner similar to that shown in FIG. 5. Guides 85, integral with base 83, slidingly support driving head 86, which is held in place in the guides by guide covers 87 secured to the guides by screws not shown. Index table 88, not shown in FIG. 7, is secured to the top of rotor 83 by suitable means. Around the periphery of rotor 83 are teeth formed by driven surfaces 89 and locking surface 90. Driving lugs 91 and 92, extending from driving head 86, carry pins 93 and 94 fitted with rollers 95 and 96, respectively. Threaded extension 97 of driving head 86 is adapted to be connected to a fluid-actuated cylinder or other resilient stroking means. Movement of driving head 86 in the direction of arrow 98, roller 95 of driving lug 91 being in contact with a driven surface 89, as shown in FIG. 7, will cause rotor 83 to rotate in the direction of arrow 99 until a locking surface 90 comes into contact with roller 95. Continued force on driving head 86 in the direction of arrow 98 then holds roller 95 in firm contact with both driven surface 89 and locking surface 90, resisting any tendency for rotor 83 to be rotated in either direction. If a force is now applied to driving head 86 in the direction opposite to that of arrow 98, roller 95 will be moved out of contact with driven surface 90, and roller 96 will be brought into contact with another driven surface 89, which was advanced into the path of travel of roller 96 as a result of the previous rotary movement caused by action of roller 95 against a driven surface 89. Continued movement of driving head 86 in the direction opposite to that of arrow 98 will effect rotary movement of the rotor in the direction of arrow 99 through action of roller 96 against driven surface 89 until movement is arrested by contact of a locking surface 90 with roller 96. Thus the rotor is again locked, and a contact surface 89 is positioned in the path of travel of roller 95 for repetition of the foregoing movements.

The indexing device of FIGS. 9–12 provides linear movement in addition to rotation and locking. Such action is useful, for example, in the automatic assembly of protecting tubes to hypodermic needles or, with the axis of rotation vertical, in dipping articles in successive liquid baths. Rotor 100 is rotatably and slidably fitted in guide 101, which is carried in support blocks 102 and clamped therein by means of caps 103 and screws 104, this construction providing both axial and angular adjustment. Fixed to one end of rotor 100 is head 105, to which may be fastened work holders tooling, an index table, or the like, the opposite end of the rotor being recessed to receive ball bearing 106, whose outer race is restrained against axial movement by shoulder 107 of the recess of rotor 100 and by snap ring 108 seated in groove 109 of the recess of rotor 100. The inner race of bearing 106 is carried on piston rod 110 of a fluid-actuated cylinder, not shown, and is restrained against axial movement relative to the piston rod by shoulder 111 of the piston rod and by snap ring 112 seated in groove 113 of piston rod 110.

In the cylindrical surface of rotor 100 are axial grooves 114 adapted to receive in sliding contact two driving lugs 115 and 116. Driving lug 116 is shown in detail in FIG. 12, driving lug 115 being the same, but opposite hand. The driving lugs pass through openings 117 in guide 101 and extend into the interior of the guide, their heads 118 fitting into recesses 119 in guide 101 and held therein by caps 103 so that the driving lugs are secured against movement in any direction. Sloped driving surface 120 of driving lug 115 meets extended driving surface 121 at line 122, locking surface 123 being paralled to extended driving surface 121: sloped driving surface 124 of driving lug 116 meets extended driving surface 125 at line 126, locking surface 127 being parallel to extended driving surface 125. Each groove 114 of rotor 100 is bounded on one side by a straight locking surface 128 running the full length of the groove and on the other side by a driven surface comprising two helically disposed driven surfaces 129 and 130 joined by extended driven surface 131, which is parallel to locking surface 128 and so spaced therefrom as to provide sliding contact between the two surfaces for driving lugs 115 and 116. Helical driven surface 129 intersects extended driven surface 131 at line 132 and extends outwardly therefrom until it intersects locking surface 128 of the next adjacent groove 114 at the end of that groove: driven surface 130, on a helix of opposite hand, intersects extended driven surface 131 at line 133 and extends outwardly therefrom until it intersects the same locking surface 128 at the opposite end of the groove. Beyond both ends of the grooves, at zones 134 and 135, the diameter of rotor 100 is reduced to clear the inward extensions of driving lugs 115 and 116, respectively. In FIG. 9, although the upper part of guide 101 is broken away, driving lug 116 and the inward extension of driving lug 115 are shown in the position in which they are normally supported.

When piston rod 110 moves in the direction of arrow 136 of FIG. 10, sloped driving surface 120 of driving lug 115 being in contact with a helical driven surface 129, the reaction between the two surfaces causes rotor 100 to rotate in the direction of arrow 137 of FIG. 11, ball bearing 106 enabling the rotor to turn without forcing piston rod 110 to rotate. As line 132 passes line 122, extended driving surface 121 comes into contact with extended driven surface 131; but, both of these surfaces being axial, turning effort in the direction of arrow 137 drops to zero. At the same instant that line 132 passes line 122, locking surface 128 of groove 114 comes into contact with locking surface 123 of the driving lug. Therefore, when extended driving surface 121 is in contact with extended driven surface 131, locking surface 123 of driving lug 115 is in contact with locking surface 128 of groove 114 of rotor 100, securing the rotor against rotation but permitting further axial movement to a limit determined externally to the device under consideration. Subsequent movement of piston rod 110 in the direction opposite to that of arrow 136 causes linear movement of rotor 100, the rotor being locked against rotation until line 122 has passed line 132, but when helical driven surface 130 of slot 114 contacts sloped driving surface 124 of driving lug 116, rotor 100 is caused to rotate, again in the direction of arrow 137, until line 133 passes line 126 and the rotor is locked against rotation due to contact between extended driving surface 125 and extended driven surface 131 on one side of driving lug 116 and between locking surface 127 and locking surface 128 on the opposite side of the driving lug, further linear movement being permitted until limited externally. The next helical driven surface 129 has been rotated into position to contact sloped driving surface 120 when the rotor is again moved in the direction of arrow 136. It will be noted that non-resilient driving means may be used to actuate this embodiment of the invention. In some cases, the linear movement at one end or the other of the travel of the rotor may advantageously be substantially zero. As illustrated, the clear space between the inward extensions of driving lugs 115 and 116 is greater than the length of slots 114, so that, when the slots are centered between the lugs, the rotor can be turned freely — an advantage during setup or checking.

The linear indexing device of FIGS. 13 and 14 is a form of the device shown in FIGS. 5 and 6 adapted to the special case in which the radius of rotation equals infinity. Driving head 138 is slidably supported by a guide, not shown, in a manner similar to that in which driving head 74 of FIGS. 5 and 6 is supported by guide 72. Driven member 139 is supported by a guide, not shown, in which it is free to slide in a direction perpendicular to the direction of movement of driving head 138. In driven member 139 are two rows of teeth formed by driven surface 140 and 141, adapted to conform to sloped driving surfaces 142 and 143, respectively, of driving lug 144 which extends from driving head 138, and locking surfaces 145 and 146, adapted to conform to locking surfaces 147 and 148, respectively, of driving lug 144. As shown in the drawing, driving surface 142 of driving lug 144 is in contact with a driven surface 140 of driven member 139 and locking surface 147 of driving lug 144 is in contact with a locking surface 145 of the driven member, so that sliding movement of driven member 139 is resisted by driving head 138. Movement of driving head 138 in the direction of arrow 149, FIG. 14, brings driving surface 143 of driving lug 144 into contact with a driven surface 141, causing driven member 139 to slide in the direction of arrow 150 of FIG. 13 until a locking surface 146 comes into contact with locking surface 148 of the driving lug. Continued force in the direction of arrow 149 locks driven member 139 against movement in either direction. Movement of driving head 138 in the direction opposite to that of arrow 149 brings driving surface 142 into contact with a driven surface 140, resulting in movement of driven member 139, again in the direction of arrow 150 until a locking surface 145 comes into contact with locking surface 147 and the driven member is again stopped and locked. After repeated stroking of driving head 138, driving lug 144 will engage the last tooth of driven member 139. By moving its guide aside, driving head 138 is moved to position 138 of FIG. 14, out of engagement with driven member 139, so that the driven member can be returned by an external force to the starting position of its travel. Driving head 138 is then returned to its normal position, engaging driven member 139, and linear indexing is repeated.

The indexing device of FIG. 15 is similar to that of FIGS. 7 and 8 except that rotor 151 is provided with internal teeth formed by driven surfaces 152 and locking surfaces 153. Pins 154 and 155 are fixed to driving lugs 156 and 157, respectively, of driving head 158, which is slidably supported by guide 159. Movement of the driving head in the direction of arrow 160 causes pin 155 to force a driven surface 152 aside, effecting rotation of rotor 151 in the direction of arrow 161 until a locking surface 153 contacts pin 155, after which continued force in the direction of arrow 160 locks the rotor. Movement of driving head 158 in the direction opposite to that of arrow 160 causes pin 154 to force a driven surface 152 aside, effecting rotation of rotor 151 in the direction of arrow 161 until a locking surface 153 contacts pin 154, after which continued force in the direction opposite to that of arrow 160 locks the rotor.

The indexing device of FIG. 16 is similar to that of FIGS. 7 and 8 except that rotor 162 is provided with outer teeth formed by outer driven surfaces 163 and outer locking surfaces 164 and inner teeth formed by inner driven surfaces 165 and inner locking surfaces 166. Pins 167 and 168, attached to driving head 169, which is slidingly supported by guide 170, carry outer roller 171 and inner roller 172, respectively. Movement of driving head in the direction of arrow 173 causes inner roller 172 to force an inner driven surface 165 aside, resulting in rotation of rotor 162 in the direction of arrow 174 until an inner locking surface 166 contacts inner roller 172, continued force in the direction of arrow 173 locking the rotor. Movement of driving head in the direction opposite to that of arrow 173 causes outer roller 171 to force an outer driven surface 163 aside resulting in rotation of rotor 162 in the direction of arrow 174 until an outer locking surface 164 contacts outer roller 171, continued force in the direction opposite to that of arrow 173 locking the rotor.

In the indexing device of FIG. 17, rotor 175 carries a number of pins 176 fixed to and extending away from the rotor, the pins being spaced apart from one another on a circle concentric with the axis of rotation of the rotor, their axes being substantially parellel to the axis of rotation of the rotor. Driving lugs 177 and 178, extend from driving head 179, which is slidably supported by fixed guide 180 in such manner as to move radially over the face of rotor 175 to which the pins are fixed, toward the rotor, each being adapted to engage in turn a pin 176. Driving surface 181 of driving lug 177 is arranged to engage a pin 176 in sliding contact, and locking surface 182 of the same lug is arranged to limit the sliding motion; likewise driving surface 183 of driving lug 178 is arranged to engage a pin 176 in sliding contact, and locking surface 184 of that lug is arranged to limit the sliding motion. Movement of driving head 179 in the direction of arrow 185 brings driving surface 181 into contact with a pin 176 and causes the pin to move aside, with consequent rotation of rotor 175 in the direction of arrow 186, until locking surface 182 contacts the pin, arresting movement of rotor 175 and locking the rotor against rotary movement as long as force is exerted in the direction of arrow 185. When the direction of action of the force is reversed, causing driving head 179 to move in the direction opposite to that of arrow 185, driving surface 183 of driving lug 178 engages the next pin 176 and causes it to rotate rotor 175 in the direction of arrow 186 until locking surface 184 arrests the movement and the rotor is locked.

In the indexing device of FIG. 18, the arrangement of pins 187 on rotor 188 is similar to the construction of the device of FIG. 17. Driving head 189, slidably supported by fixed guide 190, has at one end driving surface 191, arranged to engage a pin 187 in sliding contact, and locking surface 192, arranged to limit the sliding motion, and at its opposite end driving surface 193, arranged to engage a pin 187 in sliding contact, and locking surface 194, arranged to limit the sliding motion, the driving and locking actions being outward from within the circle of pins. Movement of driving head 189 in the direction of arrow 195 brings driving surface 191 into contact with a pin 187 and causes the pin to move aside, causing rotor 188 to rotate in the direction of arrow 196 until locking surface 192 contacts the pin, stopping movement of rotor 188 and locking the rotor. Movement of driving head 189 in the direction opposite to that of arrow 195 brings driving surface 193 into contact with a pin 187 and causes the pin to move aside, causing rotor 188 to rotate in the direction of arrow 196 until locking surface 194 contacts the pin, stopping movement of rotor 188 and locking the rotor.

In the indexing device of FIG. 19, the arrangement of pins 197 on rotor 198 is similar to the construction of the device of FIG. 17. Driving head 199, slidably supported by fixed guide 200, has at one end driving surface 201, arranged to engage a pin 197 in sliding contact, and locking surface 202, arranged to limit the sliding motion, and at its opposite end driving surface 203, arranged to engage a pin 197 in sliding contact, and locking surface 204, arranged to limit the sliding motion, the driving and locking actions being inward from outside the circle of pins. Movement of driving head 199 in the direction of arrow 205 brings driving surface 203 into contact with a pin 197 and causes it to move in the direction indicated by arrow 206, in which position locking surface 204 contacts the pin, preventing further linear movement of driving head 199 and rotational movement of rotor 198. Reverse movement of driving head likewise advances and locks the rotor.

In the indexing device of FIG. 20, rotor 207 carries a number of pins 208 fixed to and extending away from the rotor, the pins being spaced apart from one another in a plane substantially normal to the axis of rotation of the rotor. Driving lugs 209 and 210 are rigidly connected by arms 211 and 212, respectively, to driving head 213, which is slidably supported by guide 214 and arranged to move in a direction parallel to the axis of the rotor. Driving surface 215 of driving lug 209 is arranged to engage a pin 208 in sliding contact, and locking surface 216 of the same lug is arranged to limit the sliding motion; likewise, driving surface 217 of driving lug 210 is arranged to engage a pin 208 in sliding contact, and locking surface 218 of that lug is arranged to limit the sliding motion.

Driving head 215 of FIG. 21 differs from driving head 189 of FIG. 18 in having in one of its ends slot 216 bounded on one side by extended driving surface 217, an extension of locking surface 191' and on the opposite side by locking surface 218, surfaces 217 and 218 being spaced apart slightly more than the diameter of pin 187 to admit the pin into slot 216 with a minimum of play. Guide 219, in which driving head 215 is slidably supported is rotatably mounted by means of its trunnion 220 in a suitably fixed frame not shown. In the case in which driving head 215 and guide 219 of FIG. 21 are substituted for driving head 189 and guide 190, respectively, in FIG. 18 and rotor 188 with its pins 187 is stationary, movement of driving head 215 in the direction of arrow 221 brings driving surface 191' into contact with a pin 187 and causes guide 219 to rotate in the direction of arrow 222 until slot 216 engaged the pin between extended driving surface 217 and locking surface 218, preventing rotary movement of the driving head and guide. The length of slot 216 permits further movement of driving head 217 in the direction of arrow 221, rotary movement of the driving head and guide being prevented by reaction of the pin 187 against extended driving surface 217 and locking surface 218. Movement of driving head 215 in the direction opposite to that of arrow 221 of FIG. 21 causes no rotation until driving surface 193' contacts a pin 187, toward which the path of driving head 215 has been directed by the previously described rotation of guide 219 in the direction of arrow 222, further movement of the driving head then causing guide 219 to rotate in the direction of arrow 222 until locking surface 194 contacts the pin. Continued effort tending to move driving head 215 in the direction opposite to that of arrow 221 urges both driving surface 193 and locking surface 194 against the same pin, developing opposing forces which prevent rotation of the guide and driving head.

It will be understood that the embodiments described may be varied and combined in numberous ways without departing from the spirit of the invention. In any of the indexing devices, for instance, the part described as fixed may be free to move and the opposing part held, as in FIG. 21 relative to FIG. 18. Spacing the driving lugs apart so as to permit free rotation of the rotor, as described for the device of FIGS. 9–12 can be applied to other embodiments. Forward and reverse indexing, as for addition and subtraction in a counter, can be achieved by arranging two opposing indexing devices for connection to the same driven device, providing for disengaging each indexing device, as by centering the slots of FIGS. 9–11 between the driving lugs or by moving the lug of FIG. 14 to position 138 and providing means for selectively engaging and disengaging the opposing indexing devices. The center of rotation of the rotor need not necessarily be fixed nor the radius constant, but the path of movement of the indexed part, appropriately guided, may be any continuous curve between the straight line of FIG. 13 and the circular curve of FIGS. 5 and 6 and may be either closed as in FIGS. 5 and 6, or open-ended as in FIG. 13. The slots of FIGS. 9–11 may be applied to the other indexing devices as illustrated in FIG. 21, either for the purpose of providing linear movement or to enable the driving head to be driven by non-resilient means, or for both reasons. The teeth or pins engaged by the driving head or its lugs may be equally spaced, or their spacing may be varied within the limits in which driving and driven surfaces contact each other as described. The number of driving lugs is not limited to that shown and described. Whereas one lug is shown in FIGS. 5 and 6 and two in FIGS. 1–4, it is contemplated that for requirements of load distribution a driving surface may be provided for each driven surface. Likewise, in FIGS. 9–11, two lugs may be provided for each slot. The indexing device, in any of its various forms can be applied not only to positioning, but also to transmission of power; and, in cases in which the intermittent character of the movement is not critical or can be absorbed by resilient connecting means, is useful as a speed reducer or a mechanism to convert linear motion to rotary motion.

I claim:

1. An indexing device comprising:
   a first body member;
   a second body member mounted to said first body member, said first and second body members being movable relative to one another in a first predetermined path;
   a driving member mounted for reciprocal movement relative to said body member in a second predetermined path, said first predetermined path being non-parallel with said second predetermined path;
   means for coupling said driving member to a source of reciprocatory motion;
   driving lug means mounted to said driving member;
   a plurality of driven elements coupled to said second body, said driving lug means engaging said driven elements individually and successively in either direction of reciprocation of said driving member to cause intermittent relative motion in one direction in said first predetermined path; and
   stop means cooperative between said driving lug means and said driven elements to stop said relative motion in said first predetermined path during each reciprocating stroke of said driving member, said cooperative action occurring when said driving member approaches the end of its travel in one direction thereby preventing further relative motion of said first body member with respect to said second body member in said first predetermined path until said driving member moves in the opposite direction, whereupon said cooperative action also occurs between said driving lug means and said driven elements to prevent further relative motion in said first predetermined path when said driving member approaches the end of its travel in said opposite direction.

2. The indexing device recited in claim 1 wherein said driving lug means comprises first and second driving lugs, said frist driving lug, when said driving member moves in said one direction, engages one of said driven elements and creates a force component urging said relative movement in said first predetermined path, said second driving lug, when said driving member moves in said opposite direction, engages another one of said driven elements and creates a force component urging said relative movement in said first predetermined path, reciprocating motion of said driving member thereby causing intermittent relative motion between said first and second bodies in said first predetermined path.

3. The indexing device recited in claim 2 wherein relative movement in said first predetermined path pursuant to movement of said driving member in said one direction aligns one of said driven elements with said second driving lug so as to enable said second driving lug to cause relative movement in said first predetermined path when said driving member moves in said opposite direction, said movement of said driving member in said opposite direction aligns another of said driven elements with said first driving lug.

4. The indexing device recited in claim 1 wherein one of said driving lug means and said driven elements is formed with a driven surface skewed with respect to the direction of movement of said driving means and a stopping surface forming a V-shaped intersection therebetween, the other of said driving lug means and said driven elements being formed to first engage said driven surface upon movement of said driving member and then to engage both said driven surface and said stopping surface at said intersection thereby stopping relative movement in said first predetermined path.

* * * * *